2,757,453

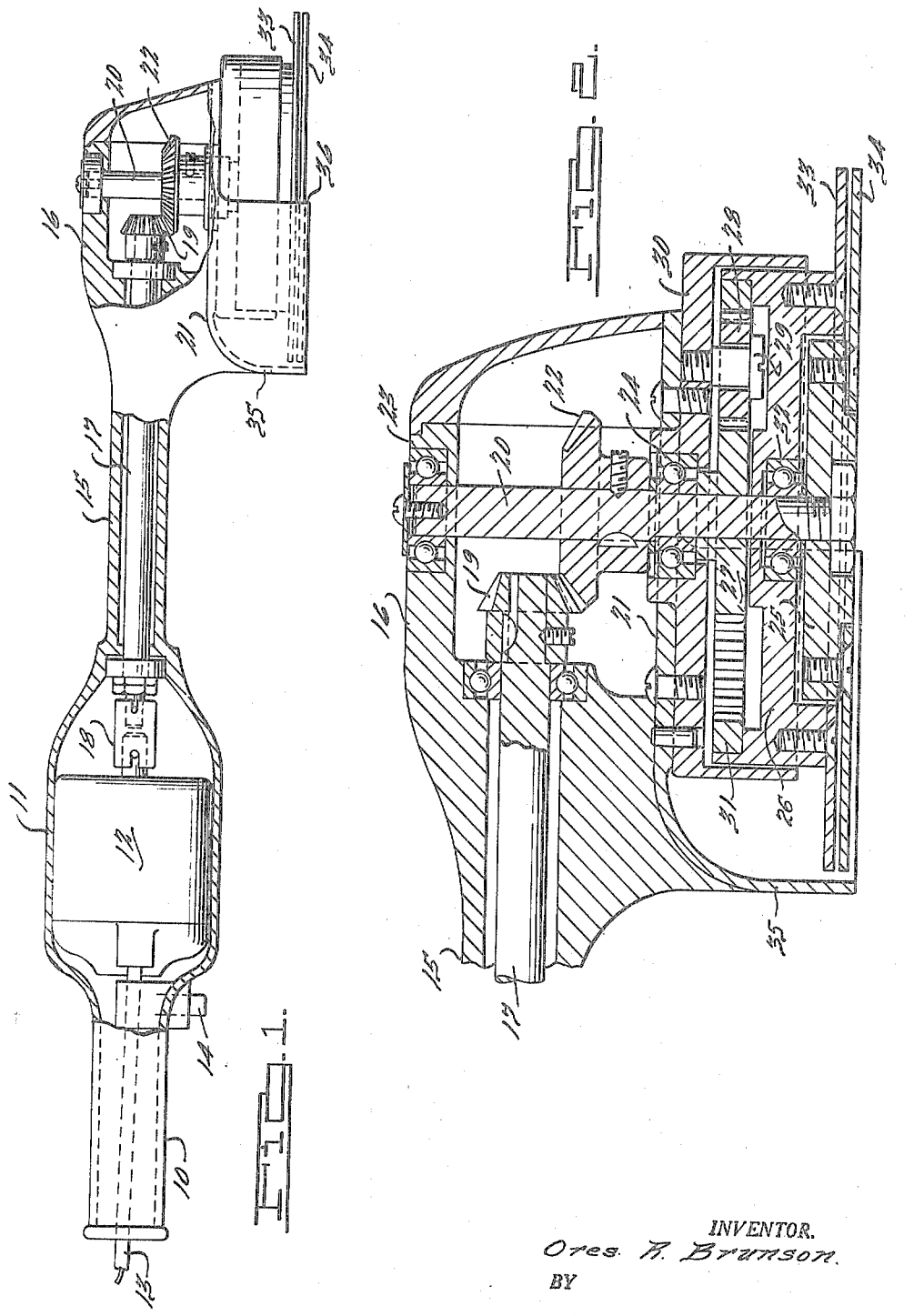

HEDGE TRIMMERS

Ores Raymond Brunson, Yardley, Pa.

Application October 6, 1954, Serial No. 460,529

3 Claims. (Cl. 30—206)

This invention relates to clippers, and more particularly to a new and improved type of hedge trimmer for use in the trimming of hedges, or the like. In the place of the common scissor action of many hedge trimmers, or the reciprocating bar action cutters also used, I herein disclose a new and improved type of hedge trimmer wherein the shearing action is carried out through a plurality of rotating blades in different planes, each set of blades in each plane revolving in opposite directions.

The above and other objects of the invention will appear more fully from the following more detailed description, and from the drawing, wherein:

Fig. 1 is a side elevation of the device, partly in section; and

Fig. 2 is an enlargement, in section, of the cutting head.

Referring now to the drawing, the numeral 10 designates a handle member which has built integrally therewith a housing member 11 adapted to receive and hold an electric motor 12. An electric lead line 13, which leads to a source of power, not shown, is threaded through the handle member to the motor, and a standard switch member 14 is provided for switching the motor on or off. A hand-grip portion 15 is also built integrally with housing member 11, terminating at one end thereof as a cutting head housing 16, the head, hand-grip portion, motor housing and handle are cast in two separate longitudinal sections and bolted together to form a single unitary structure. Hand-grip portion 15 has rotatably journaled therein a shaft 17, the same having one end thereof connected to a coupling member 18 for coupling the motor armature to said shaft 17, and a bevel gear 19 keyed on the other end of shaft 17. A vertical shaft 20 is rotatably journaled in the top of cutting head casting 16 and the bottom 21 of said head, between bearing members 23, 24. A bevel gear 22 is keyed to shaft 20 and is so located on said shaft 20 that it is in mesh with gear 19.

The shearing mechanism comprises two casting members, a lower casting member 25, which is bolted to the bottom of shaft 20, and an upper casting member 26, which is rotatably supported upon shaft 20 by means of a bevel gear 27 keyed thereto, and has in horizontal alignment, and in mesh therewith, three spur pinion gears 28 rotatably mounted upon stub shafts 29, which in turn are secured to a plate member 30 secured in turn to the bottom 21 of cutting head 16. An internally toothed ring gear 31 is carried in a recess formed in the top of upper casting 26, the same meshing at all times with the three spur pinions 28. A bearing member 32 acts as a spacer and support between the upper and lower casting members and allows the upper casting member to rotate thereon and be supported thereby. A plurality of shearing blades 33 are spaced about and carried by the bottom edge of the upper casting, and a similar number of blades 34 are spaced about and carried by the bottom edge of the lower casting, said upper and lower blades being alternated so that the upper and lower shearing blades are not in vertical alignment. The cutting head housing 16 is so formed that the rear portion of same is enclosed, as at 35, and the leading or front portion of same is open, as at 36.

The manner in which the trimmer operates is as follows:

Lead line 13 may be plugged in to any convenient electrical outlet and a long electric cord is provided so that the trimmer may be carried from place to place. To operate, switch 14 is pressed, which in turn starts electric motor 12 and rotates drive shaft 17, which is coupled thereto. Shaft 17, having bevel gear 18 keyed thereto, rotates, which, in turn, rotates bevel gear 22 keyed to vertical driven shaft 20. As driven shaft 20 rotates in a clockwise direction, lower casting 25, which is keyed thereto, also rotates in a clockwise direction carrying shearing blades 34 therewith. Bevel gear 27 is also keyed to shaft 20 and rotates therewith, said gear meshing with the three spur pinion gears 28 which are rotatably supported upon stub shafts 29 secured to plate 30, and the pinion gears 28 also mesh in turn with internally toothed ring gear 31 which is embedded in the top of casting 26, and all gears rotate in the same plane. As gear 27 turns in a clockwise direction with shaft 20, the spur pinions 28 rotate and turn ring gear 31 supported within upper casting 26 in a contra-clockwise direction carrying shearing blades 33 therewith.

As blades 33 and 34 pass over each other, at high speed, complete shearing action is provided and a hedge, or the like, is quickly trimmed to the desired height. The cutting head casting is so designed that the front or leading portion of the head is cut away to allow the top of the hedge to be cut and to be thrust forward of the cutting blades and not back against the user. The casting members, which in turn carry the shearing blades that turn in opposite directions, are fully enclosed to keep them free from foreign matter and the drive and driven shafts are also fully enclosed for the same purpose. The trimmer is built in two parts so that it may be quickly taken apart to oil or replace a motor or other parts. The shearing blades may be quickly detached from their castings for resharpening or replacement, and the entire device is light, and easy to handle.

While I have described and illustrated a satisfactory device that has proven highly successful in practical operation, it will be understood that the invention is not limited to specific constructional details shown and described, but that many changes, variations and modifications may be resorted to without departing from the principles of my invention.

I claim:

1. A hedge trimmer of the class described comprising a cutting head housing having a top and bottom, a handle member built integrally therewith, a drive shaft rotatably mounted in said handle having a gear member mounted on one end thereof, power means for rotating said shaft located in said handle, a driven shaft journaled in said cutting head housing, a gear member carried by said driven shaft adapted to mesh with said gear on one end of said drive shaft, upper and lower cutting members having radially extending shearing blades carried thereby, and means for rotating said cutting members in opposite directions comprising a lower cutting member supported on the lower end of said driven shaft and having radially extending shearing blades carried thereby, an upper cutting member having radially extending shearing blades carried thereby, supported by a bearing member on said driven shaft, a spur gear secured to said driven shaft, spur pinion gears rotatably supported from the bottom of said cutting head housing and an internally toothed ring gear supported within the top of said upper cutting member, said gear train being in mesh to provide rotation in an opposite direction from the lower cutting member.

2. A hedge trimmer comprising, in combination a cutting head housing, having a top and bottom, a handle member extending from said housing, a drive shaft rotatably mounted in said handle having a gear member on one end thereof, power means for rotating said shaft also located in said handle, a driven shaft journaled in said cutting head housing, a gear member secured to said driven shaft adapted to mesh with said gear on one end of said drive shaft, upper and lower cutting members is superimposed juxtaposition and having radially extending shearing blades spaced about the outer periphery of said cutting members, the lower of said rotating cutting members being secured directly to said driven shaft, and the upper of said rotating cutting members having an internally toothed ring gear carried in the top portion thereof, a spur gear secured to said driven shaft, and spur pinions rotatably supported upon stub shafts in the bottom of said cutting head housing, all of said gears being in mesh with each other so that as the driven shaft is rotated the lower cutting member and shearing blades turn in one direction and the upper cutting member and shearing blades turn in the opposite direction creating a shearing action between said blades.

3. A hedge trimmer as set forth in claim 2 in which the radially extending shearing blades on said upper and lower cutting members are so positioned that the blades on the upper cutting member are not in vertical alignment with the blades on the lower cutting member.

References Cited in the file of this patent

UNITED STATES PATENTS

| 2,244,683 | Fisher | June 10, 1941 |
| 2,245,821 | Poynter | June 17, 1941 |
| 2,443,027 | Dishmaker | June 8, 1948 |

FOREIGN PATENTS

| 405,732 | Great Britain | Feb. 15, 1934 |